United States Patent [19]

Nishimoto et al.

[11] Patent Number: 5,600,559
[45] Date of Patent: Feb. 4, 1997

[54] ELECTRIC POWER STEERING APPARATUS

[75] Inventors: Mitsuhiko Nishimoto, Kashihara; Hirofumi Matsuoka, Kyoto, both of Japan

[73] Assignee: Koyo Seiko Co., Ltd., Osaka, Japan

[21] Appl. No.: 638,691

[22] Filed: Apr. 26, 1996

Related U.S. Application Data

[63] Continuation of Ser. No. 339,477, Nov. 14, 1994, abandoned.

[30] Foreign Application Priority Data

Nov. 19, 1993 [JP] Japan .................................. 5-291000

[51] Int. Cl.$^6$ ........................................................ B62D 5/04
[52] U.S. Cl. .............................. 364/424.051; 74/388 PS; 180/404; 180/443; 180/412; 318/434; 318/696
[58] Field of Search ........................ 364/424.05, 426.01; 74/388 PS; 180/404, 412, 415, 443, 444; 318/432, 434, 696

[56] References Cited

U.S. PATENT DOCUMENTS

| | | | |
|---|---|---|---|
| 4,629,952 | 12/1986 | Shimizu | 318/432 |
| 4,688,655 | 8/1987 | Shimizu | 180/79.1 |
| 4,800,975 | 1/1989 | Oshita et al. | 180/142 |
| 4,896,735 | 1/1990 | Morishita et al. | 180/79.1 |
| 4,957,182 | 9/1990 | Morishita et al. | 180/79.1 |
| 5,097,918 | 3/1992 | Daido et al. | 180/79.1 |
| 5,194,794 | 3/1993 | Shamoto | 318/603 |
| 5,253,725 | 10/1993 | Nishimoto | 364/424.05 |
| 5,355,315 | 10/1994 | Daido et al. | 364/424.05 |

FOREIGN PATENT DOCUMENTS

| | | |
|---|---|---|
| 336682 | 10/1980 | European Pat. Off. . |
| 340044 | 11/1989 | European Pat. Off. . |
| 535422A1 | 4/1993 | European Pat. Off. . |

*Primary Examiner*—Kevin J. Teska
*Assistant Examiner*—Tan Q. Nguyen
*Attorney, Agent, or Firm*—Darby & Darby

[57] ABSTRACT

The present invention provides an electric power steering apparatus in which it is decided whether or not steering torque is in a predetermined drive inhibition area, and when the term in which the decision result is logically inconsistent with driving instruction for the motor in accordance with the steering torque is shorter than a predetermined period of time, a timer is reset to drive the motor. As a result, the compensation of the inertia of said motor can be controlled even when the steering torque is small. Further, in the electric power steering apparatus, the timer is also reset to drive the motor when the steering torque is in a dead zone and a driving current for the motor is smaller than a predetermined value. As a result, the drive of the motor can be controlled also when a steering wheel is returned to its initial position.

2 Claims, 6 Drawing Sheets

ELECTRIC POWER STEERING APPARATUS

This is a continuation of application Ser. No. 08/339,477, filed Nov. 14, 1994, now abandoned.

BACKGROUND OF THE INVENTION

1. Field of the Invention

The present invention relates to an electric power steering apparatus for assisting a steering power of a steering wheel by using an electric motor.

2. Description of Related Art

In an electric power steering apparatus, steering torque is detected so as to assist a steering power by using the rotation power of a motor driven in accordance with the detected torque.

FIG. 1 is a schematic block diagram of the configuration of the electric power steering apparatus. The output from a torque sensor 2 provided on a steering shaft (not shown) is inputted to a CPU 1 via an interface 3. The output is subjected to A/D conversion 11 and then phase compensation 12 in the CPU 1. The CPU 1 stores, in its memory, an target current table 13 regarding the relationship between the detected torque and an target current value for driving a motor 5 as shown in FIG. 2, and reads the target current value corresponding to the detected torque from the table 13. The output resulting from the A/D conversion 11 is also subjected to differentiation 18, and addition 14 of the differentiated value and the target current value is performed for compensation of the inertia of the motor 5.

Then, deviation 15 between the result of the addition 14 and a feedback value of the driving current for the motor 5, which is detected by a driving current detection circuit 6 and is subjected to A/D conversion 19 in the CPU 1, is obtained. The CPU 1 then performs PI calculation 16 of the result of the deviation 15 to obtain a control volume, and generates a PWM wave signal 17 and a signal indicating the rotation direction of the motor 5 in accordance with the control volume. These signals are supplied to a drive circuit 4 including an H-type bridge of four switch transistors as well as to the motor 5. Although it is not shown in FIG. 1, speed information detected by a speed sensor is also inputted to the CPU 1, and the target current value corresponding to the detected speed is read from the table 13.

Such an electric power steering apparatus also includes an inhibition circuit 7 for restricting the driving direction of the motor 5 as countermeasure using hardware against runaway of the CPU 1. By the inhibition circuit 7, the motor 5 is inhibited to be driven when the direction of the detected torque and the driving direction of the motor 5 are different from each other, thereby preventing an unforeseen accident from occurring. Actually, the motor 5 is inhibited to be driven also in a dead zone shown in FIG. 2 in which the detected torque is approximately 0. Specifically, when the torque detected by the torque sensor 2 is in a leftward driving inhibition area in FIG. 2, the inhibition circuit 7 generates a leftward driving inhibition signal so as to maintain the potential of a portion in the drive circuit 4 contributing to the leftward driving at a level where the motor 5 is not rotated, thereby allowing the rightward driving alone. Similarly, when the detected torque is in a rightward driving inhibition area, the inhibition circuit 7 generates a rightward driving inhibition signal, thereby allowing the leftward driving alone.

The detected torque, however, is subjected to the addition to the differentiated value in the CPU 1 as described above for the compensation of the inertia of the motor 5. When a car is running at an intermediate speed, the torque detected in moving the steering wheel lightly in one direction is so small that the driving current read from the target current table 13 is 0 in the dead zone, but still the addition 14 of the differentiated value is conducted. In this case, the detected torque is so small that it is in the leftward or rightward driving inhibition area. Therefore, a driving current corresponding to the differentiated value is not supplied, resulting in giving a driver unpreferable steering feeling as if he were rotating a steering wheel with a large flywheel.

Further, when the steering wheel is returned to the initial central position, it is desired to control the direction of the detected torque to be reverse to the driving direction of the motor 5 so that the steering torque in the dead zone be rapidly returned to neutral. In such a case, the detected torque is small, and hence, the table 13 is provided with a hysteresis characteristic as shown with alternate two dots and chain lines in FIG. 2 so as to enable the above-mentioned control. When the inhibition circuit 7 is provided, however, such a control is not conducted. Therefore, it is disadvantageously impossible to drive the motor 5 in the aforementioned manner in returning the steering wheel to the initial position.

SUMMARY OF THE INVENTION

The present invention is devised to solve the above-mentioned problems, and one of the objectives is providing an electric power steering apparatus in which, while preventing the runaway of a CPU, the compensation of the inertia of a motor can be controlled by using a differentiated value even when detected torque is small.

The electric power steering apparatus of the invention comprises a torque sensor for detecting steering torque, a data processor for generating an instruction for driving a motor in accordance with the detected steering torque, inhibition area decision means for deciding whether or not the detected steering torque is in a predetermined rotation inhibition area, consistency verification means for verifying logical consistency between the result of the decision by the inhibition area decision means and the instruction of the data processor, a timer clocked when the result of the verification by the consistency verification means is inconsistent, and drive inhibition means for inhibiting the drive of the motor after a predetermined period of time is clocked by the timer.

Accordingly, since the output of the differentiated value takes only a short time, the timer is reset before clocking the predetermined period of time, thereby driving the motor. The compensation of the inertia of the motor is thus controlled even when the steering torque is small.

In one embodiment, the electric power steering apparatus of the invention comprises means for inhibiting the re-drive of the motor when a predetermined period of time passes after inhibiting the drive of the motor by the drive inhibition means until a predetermined operation is performed. As a result, failsafe against the runaway of the CPU is provided.

In another embodiment, the electric power steering apparatus comprises means for resetting the timer when the instruction for driving the motor is extinguished. Therefore, the electric power steering apparatus returns to the initial state when the drive of the motor is stopped.

Another objective of this invention is providing an electric power steering apparatus in which, while preventing the runaway of a CPU, drive of a motor can be controlled in returning a steering wheel to its initial position when the detected torque is in a dead zone.

The electric power steering apparatus of the invention comprises a torque sensor for detecting steering torque, a data processor for generating an instruction for driving a motor in accordance with the detected torque, inhibition area decision means for deciding whether or not the detected steering torque is in a predetermined inhibition area, consistency verification means for verifying logical consistency between the result of the decision by the inhibition area decision means and the instruction by the data processor, a timer to clock when the result of the verification by the consistency verification means is inconsistent, drive inhibition means for inhibiting the drive of the motor after a predetermined period of time is clocked by the timer, dead zone detection means for detecting whether or not the detected steering torque is in a dead zone in which torque is approximately 0, driving current detection means for detecting a driving current supplied to the motor, and means for resetting the timer when the driving current detected by the driving current detection means is below a predetermined value and the detected steering torque is in the dead zone.

Accordingly, when the detected steering torque is in the dead zone and the driving current of the motor is smaller than the predetermined value, the timer is reset, thereby driving the motor. In this manner, the drive of the motor is controlled in returning the steering wheel to its initial position, and the compensation of the inertia is also controlled.

The above and further objects and features of the invention will more fully be apparent from the following detailed description with accompanying drawings.

DESCRIPTION OF THE PREFERRED EMBODIMENTS

The present invention will now be described referring to the accompanying drawings illustrating embodiments thereof.

Figure 1:
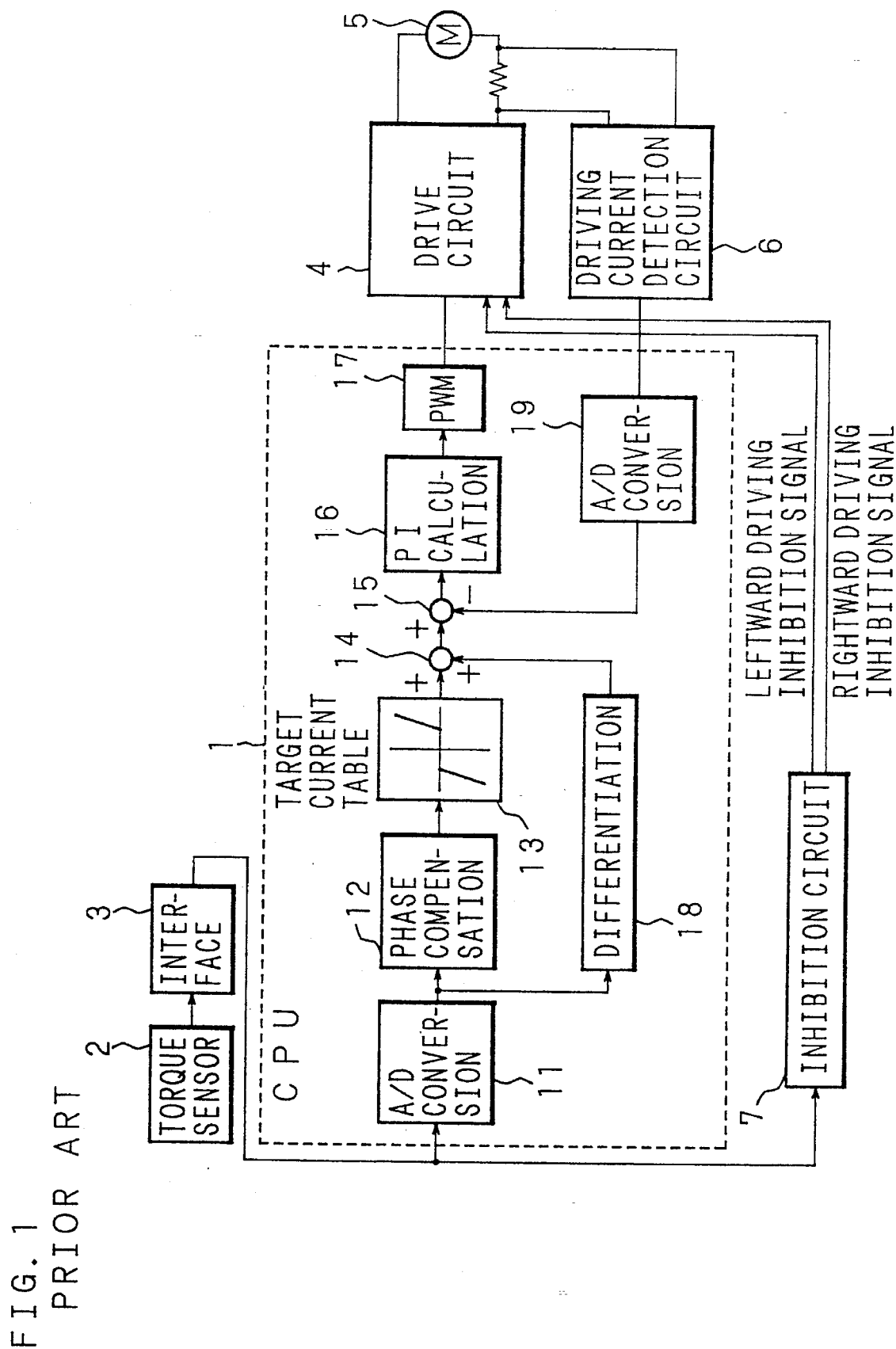
FIG. 1 is a block diagram of a major part of a conventional electric power steering apparatus.
Figure 3:
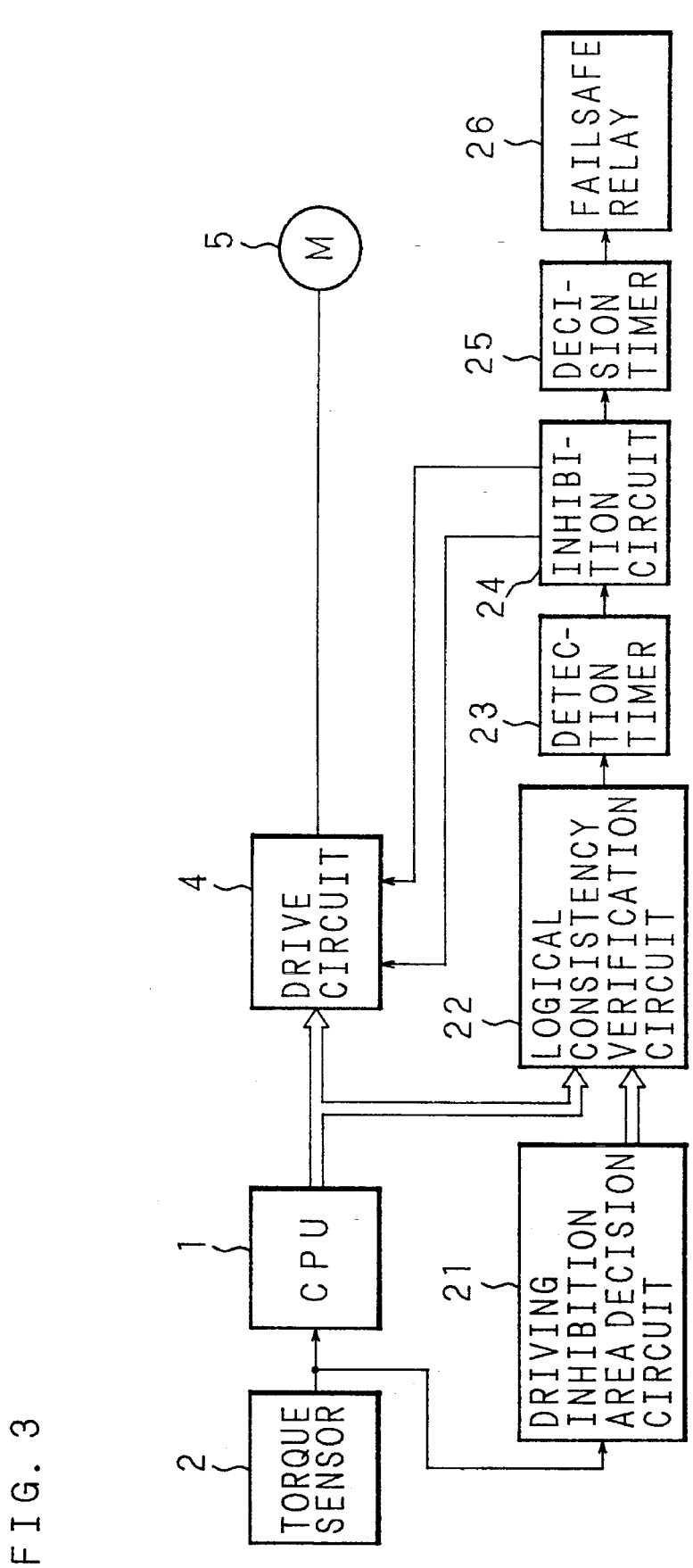
FIG. 3 is a block diagram of a major part of an electric power steering apparatus according to an embodiment of the present invention.

FIG. 3 is a block diagram of an electric power steering apparatus according to an embodiment of the invention. This electric power steering apparatus shown in the figure enables the compensation of the inertia of a motor by using a differentiated value described with regard to the conventional apparatus. The output of a torque sensor 2 for detecting torque applied to a steering shaft via a steering wheel (neither shown) is supplied to a CPU 1. The CPU 1 generates a PWM wave signal and a signal indicating the rotation direction of a motor 5 through predetermined calculation, and outputs the signals to a drive circuit 4. The drive circuit 4 actuates the motor 5 connected therewith in accordance with the signals. The configuration and the operation of the CPU 1 are the same as those of the conventional apparatus shown in FIG. 1. The present electric power steering apparatus is also provided with a feedback system by detecting the driving current for the motor 5, which is not shown in FIG. 3.

In the present electric power steering apparatus, the output from the torque sensor 2 is also supplied to a driving inhibition area decision circuit (hereinafter referred to as the DIA decision circuit) 21. The DIA decision circuit 21 decides whether or not the detected torque is in the leftward or rightward driving inhibition area shown in FIG. 2, and outputs the result of the decision in accordance with the leftward or rightward. The result is supplied to a logical consistency verification circuit 22, where the result is compared with the signal indicating the rotation direction of the motor 5 generated in the CPU 1. The logical consistency verification circuit 22 verifies the logical consistency between the signal outputted from the DIA decision circuit 21 and the signal indicating the rotation direction of the motor 5. When they are not consistent, namely, when the detected torque is decided to be in the rightward or leftward driving inhibition area by the DIA decision circuit 21 and the signal generated by the CPU 1 indicates the rightward or leftward driving, the logical consistency verification circuit 22 supplies an inconsistency signal to a detection timer 23. The detection timer 23 starts clocking in response to the inconsistency signal from the logical consistency verification circuit 22, and outputs a predetermined signal when the inconsistency signal is continuously supplied for a determined period of time. The period of time is preferably set to be 30 to 50 milliseconds (msec) in consideration of time required for the differentiation.

The detection timer 23 is reset when the CPU 1 stops generating the signal indicating the rotation direction, i.e., when the CPU 1 stops driving the motor 5. The output from the detection timer 23 is supplied to an inhibition circuit 24. The inhibition circuit 24 fixes the potential of a specified portion (i.e., the gate) of a switching element (FET) constituting the drive circuit 4 at a potential for turning off the switching element. The output from the inhibition circuit 24 is also supplied to a decision timer 25. The decision timer 25 clocks a term when the inhibition circuit 24 is outputting a signal for inhibiting the rotation of the motor 5. When the term becomes a predetermined value (for example, 0.2 seconds), the decision timer 25 excites a failsafe relay 26, thereby cutting off the drive of the motor 5.

Figure 4:
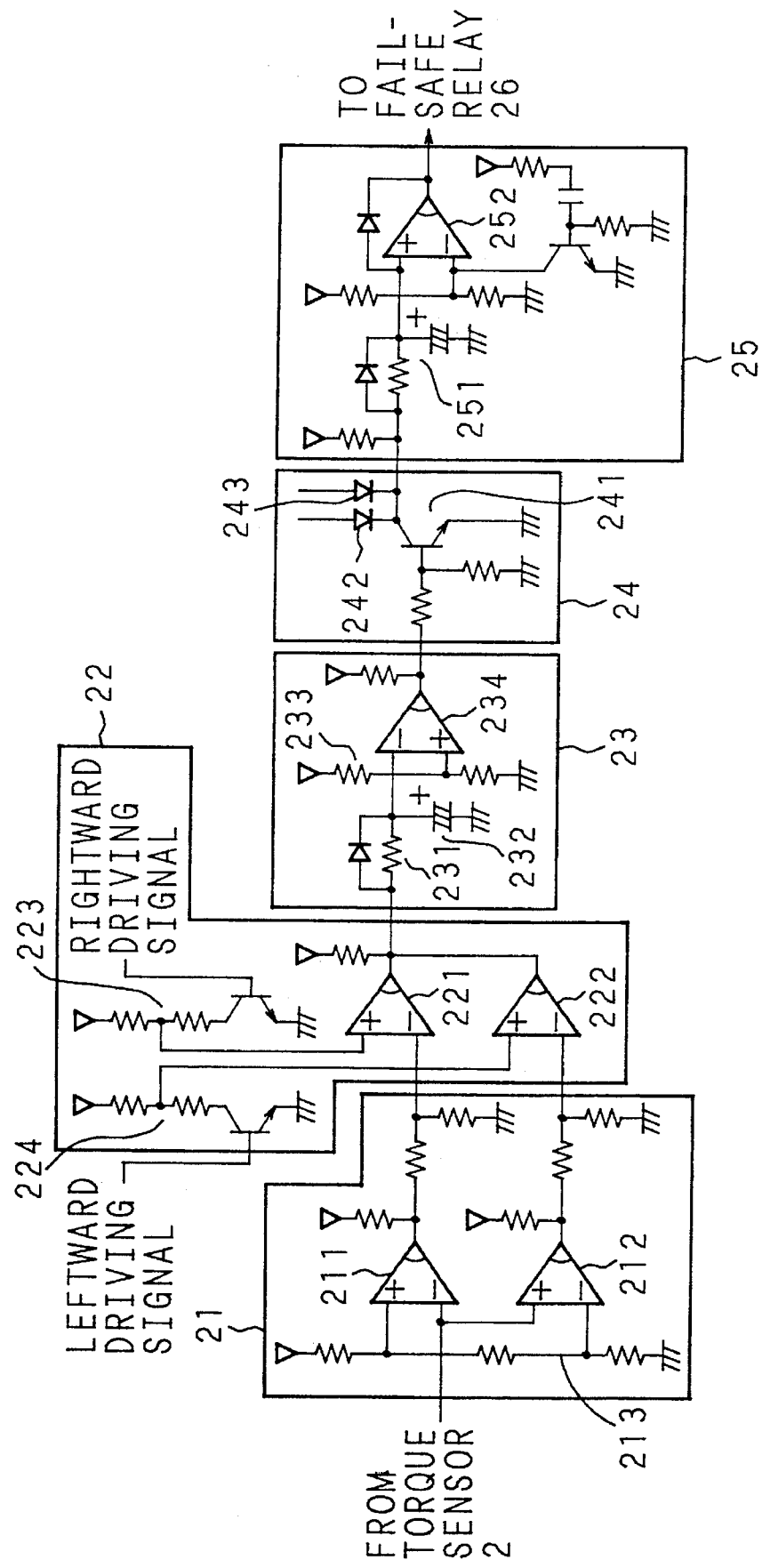
FIG. 4 is a circuit diagram of the electric power steering apparatus of FIG. 3.

FIG. 4 is a circuit diagram of a major part of the present electric power steering apparatus of FIG. 3. The DIA decision circuit 21 includes two comparators 211 and 212, and the output of the torque sensor 2 is connected with the minus input terminal of the comparator 211 and the plus input terminal of the comparator 212. The other terminals of the comparators 211 and 212 are applied with a desired voltage by a voltage divider 213 in the following manner: the plus input terminal of the comparator 211 is applied with a voltage corresponding to the point R in FIG. 2, that is, a limit value of the rightward driving; and the minus input terminal of the comparator 212 is applied with a voltage corresponding to the point L in FIG. 2, that is, a limit value of the leftward driving.

The outputs from the comparators 211 and 212 are respectively supplied to the minus input terminals of comparators 221 and 222 in the logical consistency verification circuit 22. The plus input terminals of the comparators 221 and 222 are respectively connected with nodes between resistances that are connected in series so as to form voltage dividers 223 and 224 together with transistors, respectively. The bases of the respective transistors in the voltage dividers 223 and 224 are supplied with signals for respectively instructing the rightward and leftward driving of the motor 5. The respective transistors are turned on in accordance with these signals. The outputs from the comparators 221 and 222 are collectively pulled up and connected with the detection timer 23 including a CR circuit as a main part. The outputs from the comparators 221 and 222 are supplied to one end of a resistance 231. A junction point between the other end of the resistance 231 and a capacitor 232 is connected with the minus input terminal of a comparator 234, whose plus input terminal is applied with a constant voltage by a voltage divider 233.

The output from the detection timer 23 is supplied to the inhibition circuit 24. The inhibition circuit 24 includes a transistor 241 that is turned on by the output at a high level from the comparator 234 in the detection timer 23. The inhibition circuit 24 further includes diodes 242 and 243 whose cathodes are connected with the collector of the transistor 241 that has a ground potential when the transistor 241 is turned on. The anodes of the diodes 242 and 243 are connected with the gate of a switching FET in the drive circuit 4 so that the FET of the drive circuit 4 is cut off when the transistor 241 is turned on, thereby cutting off the drive of the motor 5. The potential at the collector of the transistor 241 is supplied, as the output from the inhibition circuit 24, to one end of a pulled up resistance in a CR circuit 251 of the decision timer 25. The junction point between the other end of the resistance in the CR circuit 251 and a capacitor is connected with the plus input terminal of a comparator 252, whose minus input terminal is applied with a constant voltage by a voltage divider. The output from the comparator 252 is supplied to the failsafe relay 26 as an operational signal.

The operation of the above-mentioned circuits will now be described. When the output from the torque sensor 2 is not in the dead zone (i.e., the area between the points R and L in FIG. 2), the output from the comparators 211 and 212 are both at a low level, and therefore, the minus input terminals of the comparators 221 and 222 have potential approximately the same as the ground potential. When the CPU 1 is normally operated, a rightward or leftward driving signal is supplied to the transistors in the voltage dividers 223 and 224, thereby turning on the transistors to supply divided voltages from the voltage dividers 223 and 224 to the comparators 221 and 222, respectively. As a result, the outputs from the comparators 221 and 222 are at a high level, and the capacitor 232 in the detection timer 23 is not discharged for starting clocking.

When the output from the torque sensor 2 is in the dead zone, the outputs from the comparators 211 and 212 are at a high level on the contrary. When the CPU 1 does not output a rightward or leftward driving signal in this case, the transistors in the voltage dividers 223 and 224 remain off. Therefore, the plus input terminals of the comparators 221 and 222 are applied with a supply voltage of the voltage dividers 223 and 224, respectively, and the outputs from the comparators 221 and 222 remain at a high level. Such a state is included in the normal operation of the CPU 1, and hence the detection timer 23 does not start clocking.

When the output from the torque sensor 2 is in the dead zone, and the CPU 1 outputs a rightward or leftward driving signal, the transistors in the voltage dividers 223 and 224 are turned on, thereby decreasing the input voltage to the plus input terminal of the comparator 221 or 222. As a result, the output from the comparator 221 or 222 becomes low. This causes the discharge of the capacitor 232 so as to decrease the voltage at the terminal thereof. When a rightward or leftward driving signal is generated by the CPU 1 through the control using the differentiated value, the rightward or leftward driving signal extinguishes in an instant, and the outputs from the comparators 221 and 222 become high. Therefore, the voltage at the terminal of the capacitor 232 does not decrease below the output voltage of the voltage divider 233, thereby maintaining the output from the detection timer 23, i.e., the comparator 234, at a low level.

On the contrary, when the term in which the outputs from the comparators 221 and 222 remain at a low level lasts long due to the runaway or the like of the CPU 1, the voltage at the terminal of the capacitor 232 further decreases As a result, the output from the comparator 234 undergoes a low to high transition, thereby turning on the transistor 241 so as to inhibit the drive of the motor 5. When the transistor 241 is turned on, the plus input of the comparator 252 in the decision timer 25 is also decreased. When such a decrease lasts long so that the plus input be lower than the minus input, the output from the comparator 252 undergoes a high to low transition in time, thereby exciting the failsafe relay 26.

Now, driving control for the motor 5 in the above-mentioned apparatus will be described. As described above, the output from the torque sensor 2 is determined whether or not being in the rightward or leftward driving inhibition area by the DIA decision circuit 21, and a signal in accordance with the determination is generated. When the detected torque is in the dead zone, both a rightward driving inhibition signal and a leftward driving inhibition signal are generated.

When the CPU 1 is normally operated and the detected torque is not in the dead zone, a signal indicating the rotation direction outputted by the CPU 1 is logically consistent with the output from the DIA decision circuit 21. Specifically, when the detected torque is on the point A in FIG. 2, the signal outputted by the CPU 1 instructs the rightward driving and the output from the DIA decision circuit 21 inhibits the leftward driving. In such a case, there is no problem. Accordingly, the logical consistency verification circuit 22 does not output any signal, and hence the subsequent circuits are not actuated. The motor 5 is driven in the rightward direction in this case.

When the CPU 1 outputs a signal for instructing the leftward driving due to the runaway of the CPU 1, although the detected torque is on the point A, the logical consistency verification circuit 22 outputs an inconsistency signal. This starts clocking by the detection timer 23, which is continued until the predetermined period of time passes. Then, a timing signal is supplied to the inhibition circuit 24, thereby stopping the drive circuit 4. This stops the motor 5, resulting in inhibiting a dangerous assisting of the steering power in the reverse direction. When the runaway of the CPU 1 is temporary, the logical consistency of two signals inputted to the logical consistency verification circuit 22 can be obtained therein in time, and the detection timer 23 is reset at that time. The detection timer 23 is reset also when the detected torque is in the dead zone and the CPU 1 stops the drive of the motor 5 in either direction.

After the inhibition circuit 24 outputs a signal for inhibiting the drive of the motor 5, the decision timer 25 starts clocking. When the term clocked by the decision timer 25 lasts for the predetermined period of time, the failsafe relay 26 is actuated, thereby cutting off the power supply to the motor 5. The excitement of the failsafe relay 26 is eliminated by resetting the entire power steering apparatus, and in this case, the power steering apparatus returns to the initial state.

Next, the compensation of the inertia by using the differentiated value in or in the vicinity of the dead zone will be described. When the detected torque is on the point B in FIG. 2, the CPU 1 outputs a signal for instructing the rightward or leftward driving of the motor 5 through the addition of the differentiated value to the detected torque. When the detected torque is on the point B, the DIA decision circuit 21 outputs a signal indicating that the detected torque is in the rightward and leftward driving inhibition areas, and hence, the logical consistency verification circuit 22 outputs an inconsistency signal. Although the detection timer 23 starts clocking in response to this inconsistency signal, the output of the differentiated value takes only a short time, and therefore, the output of the differentiated value or the rightward or leftward driving signal generated due to the output of the differentiated value extinguishes before lasting the predetermined period of time. In this manner, the compensation of the inertia is controlled by using the differentiated value.

Figure 5:
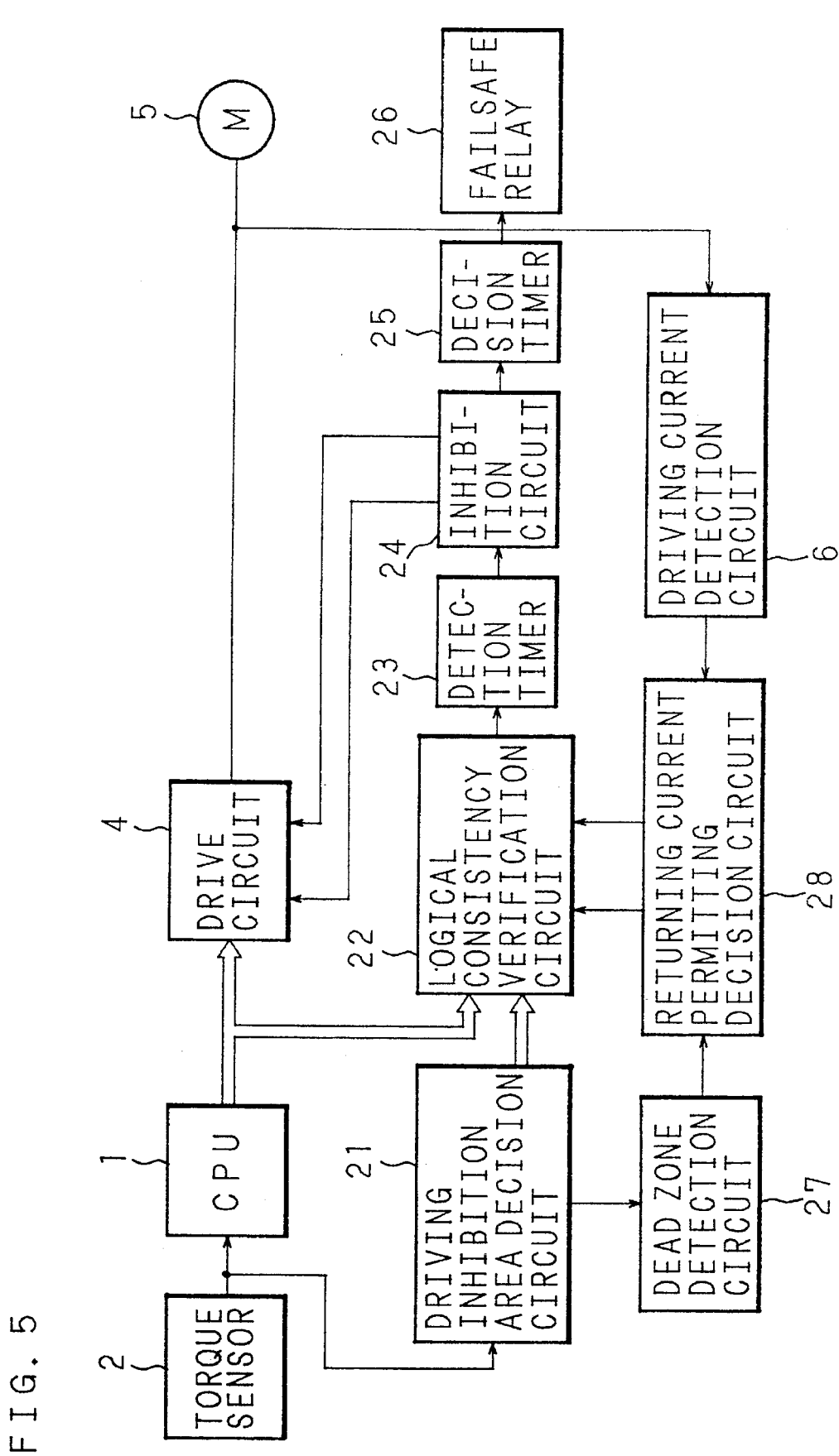
FIG. 5 is a block diagram of a major part of an electric power steering apparatus according to another embodiment of the invention.

FIG. 5 is a block diagram of another configuration of the present electric power steering apparatus. The power steering apparatus shown in FIG. 5 also enables the compensation of the inertia by using the differentiated value as that shown in FIG. 3, and in addition, it is possible to control the return of the steering wheel to the initial position.

The output from the DIA decision circuit 21 is supplied to a dead zone detection circuit 27. The dead zone detection circuit 27 detects whether or not the detected torque is in the dead zone shown in FIG. 2. When the torque is detected in the dead zone, the dead zone detection circuit 27 supplies its predetermined output to a returning current permitting decision circuit (hereinafter referred to as the RCP decision circuit) 28. In a driving current supplying line connecting the RCP decision circuit 28 with the motor 5, a driving current detection circuit 6 is interposed. In the case where the RCP decision circuit 28 receives the output from the dead zone detection circuit 27 indicating that the detected torque is in the dead zone, the driving current detection circuit 6 supplies the output for resetting the detection timer 23 when the detected driving current is below a predetermined value (for example, 10 ampere (A)).

The predetermined value to be used for resetting the detection timer 23 is required to be approximately as large as that required in returning the steering wheel to the initial position. Further, the value is necessary to be sufficiently applicable to extraordinary driving power of the motor 5 due to the runaway of the CPU 1, i.e., sufficiently large for a driver to deal with the extraordinary force by enhancing the steering force applied by the driver himself.

The like elements in this configuration shown in FIG. 5 are referred to with the like reference numerals used in FIG. 3, and the description thereof is herein omitted.

Figure 6:
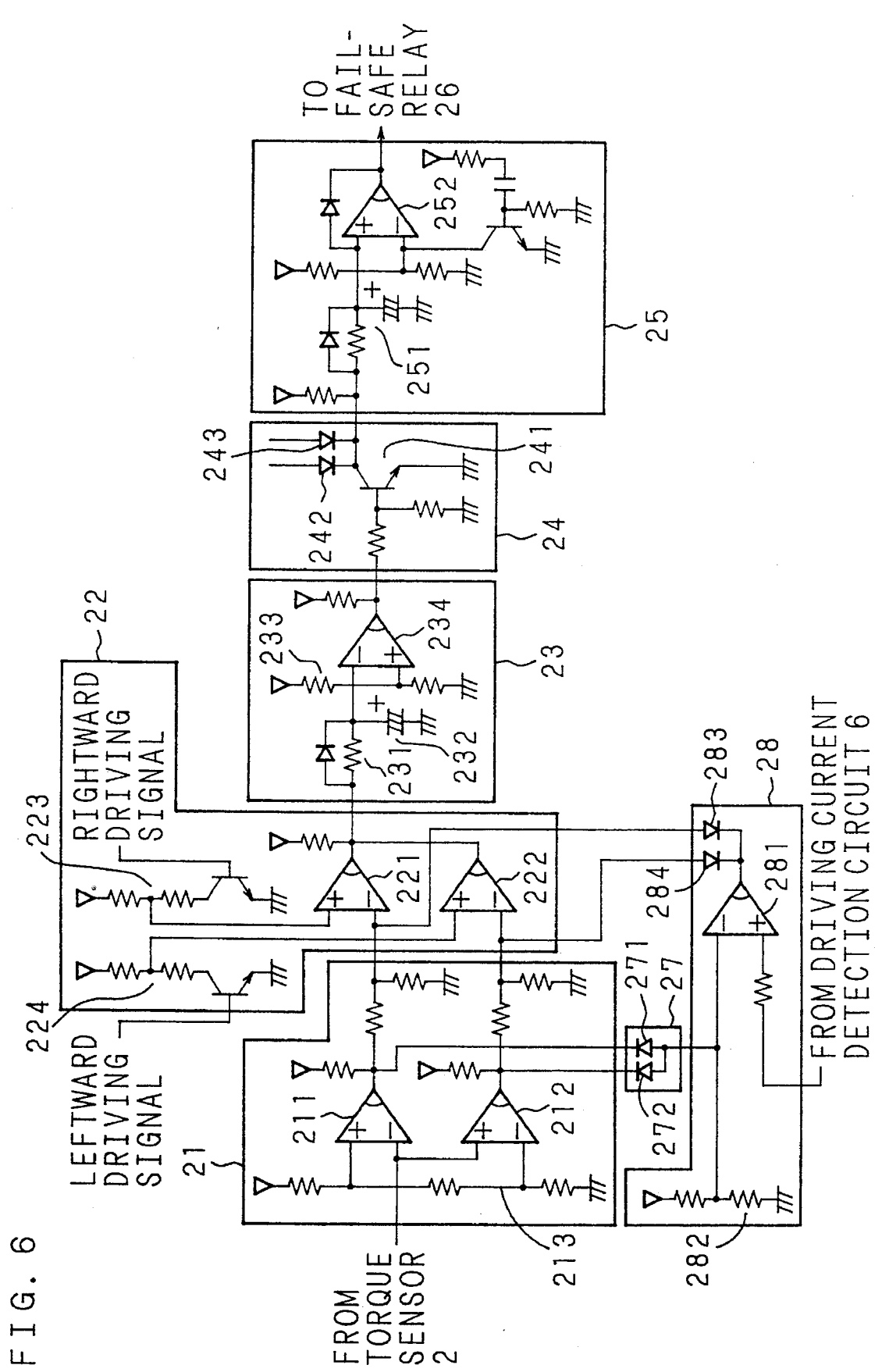
FIG. 6 is a circuit diagram of the electric power steering apparatus of FIG. 5.

FIG. 6 is a circuit diagram of the major part of the power steering apparatus of FIG. 5. The output terminals of the comparators 211 and 212 in the DIA decision circuit 21 are respectively connected with the cathodes of diodes 271 and 272 in the dead zone detection circuit 27. The anodes of these diodes 271 and 272 are collectively connected with the minus input terminal of a comparator 281 in the RCP decision circuit 28. The minus input terminal of the comparator 281 is also supplied with the output from a voltage divider 282, and the plus input terminal of the comparator 281 is applied with an output voltage from the driving current detection circuit 6. The output terminal of the comparator 281 is connected with the cathodes of diodes 283 and 284, whose anodes are respectively connected with the minus input terminals of the comparators 221 and 222 in the logical consistency verification circuit 22.

As described above, when the output from the torque sensor 2 is not in the dead zone, the outputs from the comparators 211 and 212 are at a low level, and when it is in the dead zone, the outputs are at a high level. When the detected torque is not in the dead zone and the outputs from the comparators 211 and 212 are at a low level, the output from the comparator 281 is always at a high level. In this case, the diodes 283 and 284 are not conducted, resulting in not affecting the comparators 221 and 222.

When the output from the torque sensor 2 is in the dead zone, the minus input terminal of the comparator 281 is applied with a divided voltage from the voltage divider 282. Under this condition, when the output from the driving current detection circuit 6 is low (i.e., when the steering wheel is returned to the initial position), the output from the comparator 281 is at a low level, thereby making the minus input terminals of the comparators 221 and 222 have a ground potential. As a result, the outputs from the comparators 221 and 222 undergo a low to high transition, resulting in charging the capacitor 232 in the detection timer 23. In this manner, the detection timer 23 is reset.

When the output from the driving current detection circuit 6 becomes higher than the output from the voltage divider 282, the output from the comparator 281 becomes high, resulting in not affecting the logical consistency verification circuit 22 and the detection timer 23.

Figure 2:
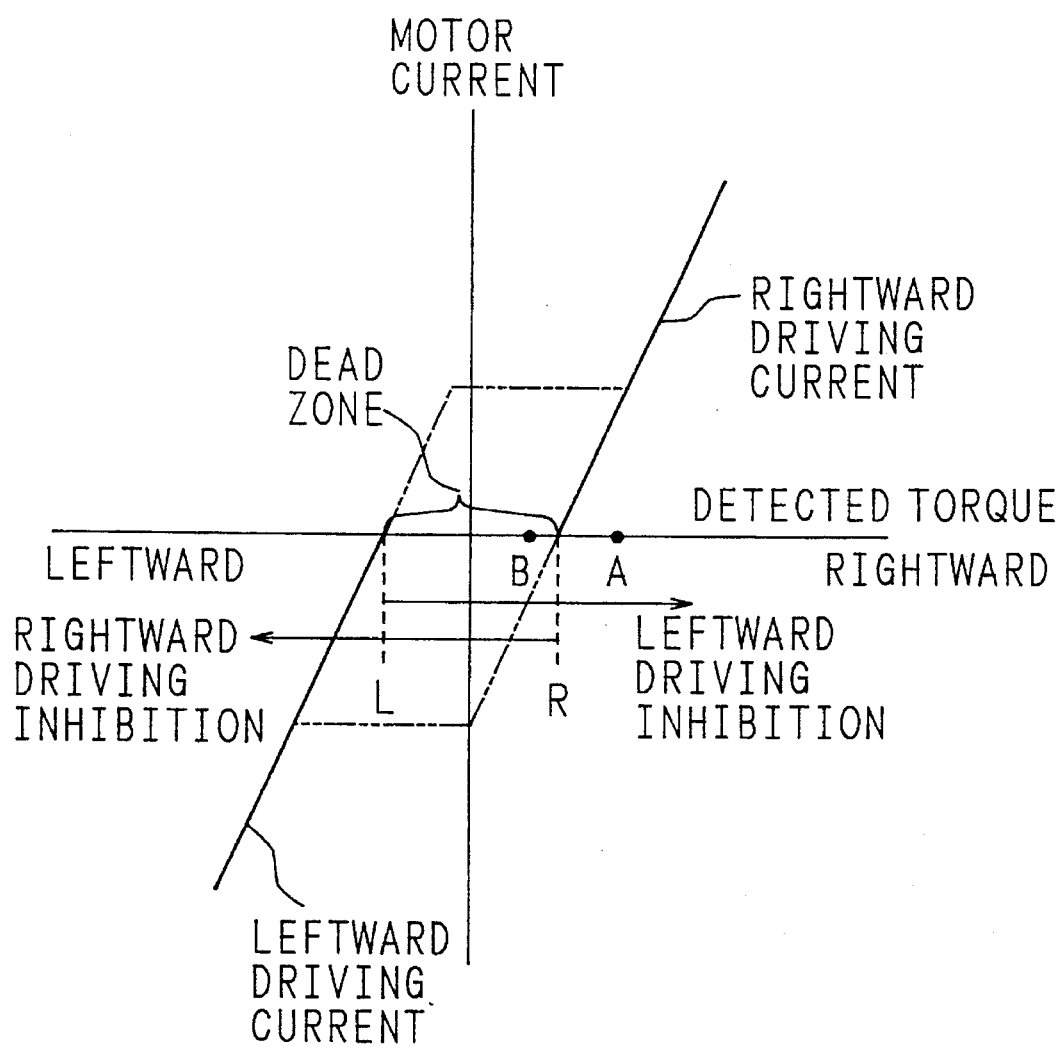
FIG. 2 is a view illustrating the operation of the usual electric power steering apparatus.

The driving control for the motor 5 in the above-mentioned power steering apparatus will now be described. When the detected torque during the return of the steering wheel is in the dead zone, the dead zone detection circuit 27 detects it and supplies a detection signal to the RCP decision circuit 28. A current flowing in such a case is smaller than a driving current flowing at the time of steering as shown in FIG. 2, and hence the input from the current detection circuit 6 does not exceed the predetermined value (for example, 10 A). Therefore, the RCP decision circuit 28 resets the detection timer 23 via the logical consistency verification circuit 22. As a result, since the detection timer 23 does not supply its output to the inhibition circuit 24, the motor 5 is driven in a manner for returning the steering wheel to the initial position. In this manner, the compensation of the inertia by using the differentiated value is performed. It is also possible to directly reset the detection timer 23 by the output from the RCP decision circuit 28.

When the detected torque is not in the dead zone due to the runaway of the CPU 1, or when the detected driving current exceeds the predetermined value, the RCP decision circuit 28 does not output a signal for resetting the detection timer 23. In such a case, the inhibition circuit 24 is actuated to stop the drive of the motor 5. The rest of the operation of this power steering apparatus is similar to that of the apparatus of FIG. 3, and the description thereof is herein omitted.

The DIA decision circuit 21, the logical consistency verification circuit 22, the detection timer 23, the inhibition circuit 24, the decision timer 25, the dead zone detection circuit 27 and the RCP decision circuit 28 all constituted of analog circuits in the above-mentioned embodiments can be built up with digital circuits or software.

In the aforementioned electric power steering apparatus of this invention, even in the case of the runaway of the CPU, safety can be secured by stopping the motor. Further, the runaway of the CPU would spoil neither the compensation of the inertia by using a differentiated value of the output from the torque sensor nor the control for returning the steering wheel to the initial position.

As this invention may be embodied in several forms without departing from the spirit of essential characteristics thereof the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus, comprising:

a torque sensor for detecting steering torque;

a data processor for generating a control signal for driving a motor corresponding to a value obtained by adding a target value in accordance with the steering torque detected by said torque sensor and a differentiated value of the steering torque detected by said torque sensor;

inhibition zone decision means for deciding whether or not the steering torque detected by said torque sensor is in a predetermined driving direction inhibition zone;

consistency verification means for verifying logical consistency or determining inconsistency between a result of a decision by said inhibition zone decision means and the motor control signal generated by said data processor;

a timer to time the period during which a result of verification by said consistency verification means is determined as being inconsistent;

drive inhibition means for inhibiting drive of said motor at a predetermined time set to occur after the time that the signal of said differentiated value of the steering torque disappears as timed by said timer; and means for inhibiting re-drive of said motor until the control signal for driving said motor disappears upon a predetermined period of time passing after the drive of said motor is inhibited by said drive inhibition means.

2. An electric power steering apparatus according to claim 1 wherein said torque sensor detects steering torque corresponding to movement of a steering wheel relative to an initial position, and further comprising:

dead zone detection means for detecting whether or not the steering torque detected by said torque sensor is in a dead zone in which torque is approximately zero;

driving current detection means for detecting a driving current of said motor; and means for resetting said timer when the driving current detected by said driving current detection means is below a predetermined value equivalent to a current value required when the steering wheel is returned to the initial position and the steering torque detected by said torque sensor is in the dead zone.

* * * * *